ELECTRIC SWITCH MECHANISM

Original Filed Oct. 10, 1967 2 Sheets-Sheet 1

INVENTOR
GORDON H. CORK
BY
Burton & Parker
ATTORNEYS

ELECTRIC SWITCH MECHANISM

Original Filed Oct. 10, 1967 2 Sheets-Sheet 2

INVENTOR
GORDON H. CORK

United States Patent Office

Re. 27,406
Reissued June 27, 1972

27,406
ELECTRIC SWITCH MECHANISM

Gordon H. Cork, Birmingham, Mich., assignor to Gemco Electric Co., Clawson, Mich.

Original No. 3,474,204, dated Oct. 21, 1969, Ser. No. 677,833, Oct. 10, 1967, which is a continuation-in-part of Ser. No. 625,544, Mar. 23, 1967. Application for reissue Apr. 23, 1970, Ser. No. 31,359
Int. Cl. H01h *1/36*
U.S. Cl. 200—164 R 4 Claims

Matter enclosed in heavy brackets [ ] appears in the original patent but forms no part of this reissue specification; matter printed in italics indicates the additions made by reissue.

ABSTRACT OF THE DISCLOSURE

This disclosure shows switch mechanism wherein the switch comprises cooperating electric contact portions operable to move into contact with each other to make the circuit or to move out of contact with each other to break the circuit. One contact is a fixed contact and the other contact is a movable contact. When the two contacts are brought into contact with each other the construction is such that one contact has its contact face wiped across relative to the other contact face so as to clean the same and keep the contact faces free from undesirable deposits.

This application constitutes a continuation-in-part of my earlier application, Ser. No. 625,544, filed Mar. 23, 1967, now abandoned.

An object is the provision of an electric switch mechanism having cooperating electric contact portions relatively shiftable along a line into one position at which they are in contact with each other and into another position in which they are out of contact with each other, and wherein the construction is such that following initial contact between them one of the contact portions is so actuated as to wipe its contact face over the contact face of the other contact portion to free the contact faces from undesirable deposits thereon.

More particularly following relative movement of said contact portions into contact with each other, one of said contact portions is moved with respect to the other contact portion along a line of movement other than the line of movement which brought the contact portions into contact with each other, wiping the contact faces of said contact portions over one another. More specifically following the movable contact being shifted into engagement with the fixed contact and as the movable contact is wiped across the face of the fixed contact it is along a line of movement angularly and generally perpendicularly with respect to the line of movement which brought the movable contact into contact with the fixed contact.

The switch described may take variant forms whereby its two electric contact portions are shiftable relatively to move them into and out of contact with each other and whereby when engagement of the contact portions has been made the contact face of one portion is wiped across the contact face of the other portion as hereinabove set forth. Two somewhat specifically different forms are here illustrated.

In the first form shown in FIGS. 1 through 3 the switch has a movable contact including a flexible arm adapted to respond to means acting thereupon to shift it to one of its two positions. Further means is provided acting upon the flexible arm to flex it when its contact is in engagement with the fixed contact and in the flexing to wipe its contact across the face of the fixed contact.

The form shown in FIGS. 1 through 3 shows the flexible arm as one having two prongs. The arm is generally in the shape of a U, with the two prongs being shiftable to bring both into electrically conductive contact with two electrically conductive portions of the fixed contact. The two prongs are independently flexible.

FIGS. 4 through 7 shows a second form of my improved switch wherein the movable contact comprises a relatively rigid arm which is supported to be moved to bring its contact portion into engagement with the fixed contact portion of the switch. Like the arm shown in the first form, the arm of the second form is pivotally supported for swingable movement of its outer and free end. This arm, however, is not flexible as is that in the first form but is rigid. It carries on its outer end a swingable or a tiltable contact portion which is so mounted upon the arm as to be shiftable relative thereto to wipe its contact face across the face of the fixed contact of the switch, as shown in the drawings FIGS. 4–7, and such is done after these cooperating contact faces are brought into engagement.

In the drawings, FIG. 1 is a view showing the interior and working parts of a compact switch of the invention herein disclosed;

Figure 1:
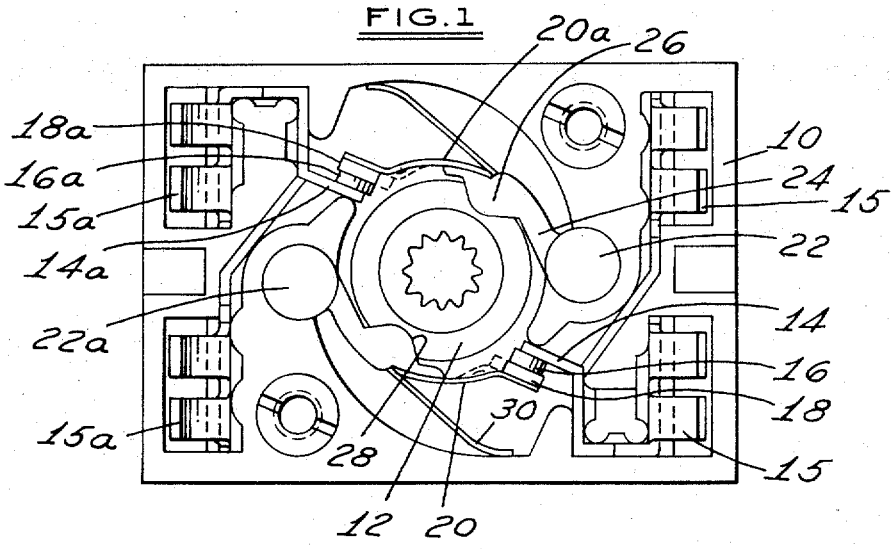

In the drawing, and particularly in FIG. 1, 10 indicates a housing within which the movable parts of the switch are carried. There is a control member or part 12 which has an extension that projects outwardly of the casing to be engaged for actuation. This might be a longitudinally shiftable plunger or a rotatable one. It is shown here as rotatable. There are two spaced-apart fixed contacts located within the casing, one indicated by the numeral 14, and the other by numeral 14–a. These two fixed contacts are identical. Each of these fixed contacts 14 and 14–a has a contact portion per se 16 and 16–a as shown in FIG. 1. Each contact portion per se 16 and 16–a, as the case may be, is adapted to be engaged by a contact portion 18 or 18–a carried by a movable contact arm 20 as shown. It is understood that there are two movable contact arms 20 and 20–a which are also identical.

Figure 2:
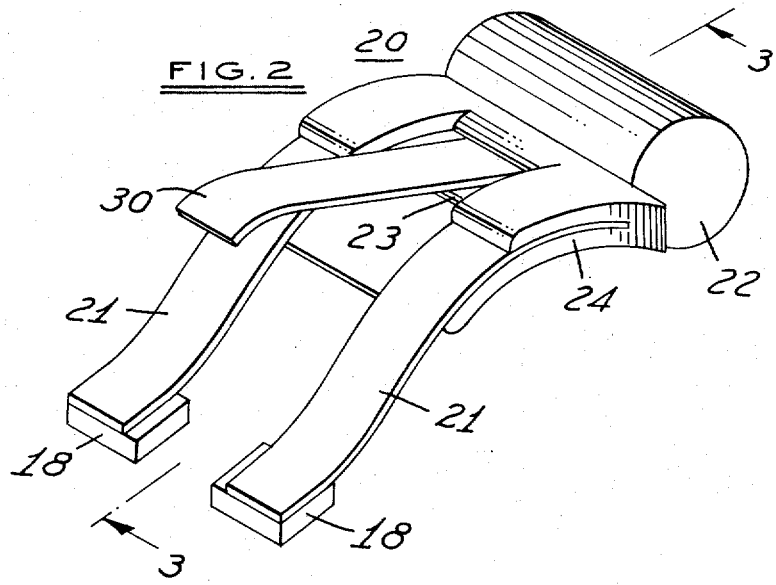
FIG. 2 is a perspective of one of the movable switch contact members.

In view of this conformation identity, I am describing only movable contact arm 20 and its cooperation with its fixed contact. The other movable contact arm 20–a and its cooperating fixed contact carry the same numbers plus the small letter a. The movable arm is generally U-shaped having two resilient prongs extending in the same direction away from the base of the U. These prongs are independently flexible and formed of electrically conductive spring material and are best shown in FIG. 2 of the drawing. The base of the movable contact which carries the prongs and therewith forms the U-shaped arm assembly is likewise shown best in FIG. 2. It embodies a cylindrical base portion 22 which is supported within the casing to permit pivotal or swingable movement of the rm to swing the outer ends of the prongs toward or away om its fixed contact.

Figure 3:
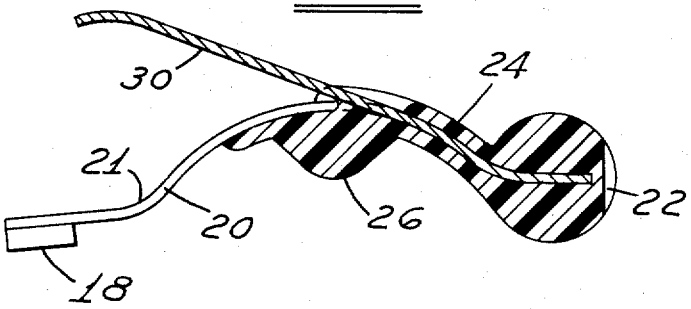
FIG. 3 is a sectional view taken on line 3—3 of FIG. 2.

FIGS. 2 and 3 show that there is a non-conductive part 4 carried by this base cylindrical mounting 22. The part 4 of the arm is provided with a protruding portion or ump 26 shown in FIG. 3. These conductive metal prongs re connected at the base by a metal web 23 extending beveen the prongs to form a conductive U-shaped metal rm 20 embedded within a plastic base 24.

The hump is adapted upon rotation of the control 12 fall within recess 28, with which such control is proided, as shown in FIG. 1. There are two recesses, one or the hump of each arm, adapted to reecive the proiberances permitting the two arms to be swung to a point here the contact members per se at the outer free ends f the arms engage the contact portions per se of the fixed ontact members, as shown in FIG. 1.

The U-shaped arm is also provided with a flat resilient ring-like prong 30. As a matter of fact the two prongs nd the connecting web 23 and the prong 30 may all conitute parts of a single piece of metal but such is not early shown here. One such is shown in FIG. 2. It also ppears in FIG. 3. The outer end of this prong 30 bears gainst an interior wall of the housing as shown in FIG. and exerts a tension upon the arm tending to swing the ime to urge the hump of the arm into the depression 28 f the control when the depression is presented to the ump.

It will be seen that this resilient spring prong element 0 is adapted to exert a rotatable pressure upon its movle switch member as shown particularly in FIGS. 2 and . Such urges the switch contacts at the outer ends of the vo prongs of the arm against the fixed contacts within e housing when the proturberance 26 comes into the cess 28 of the control member 12 as shown in FIG. 1, ermitting the arm to be swung sufficiently to permit the ontacts 18 at the outer ends of the prongs to engage the xed contacts.

The resilience of the member 30 is such that it is capale of flexing both prongs 21 when the movement thereof arrested by the fixed contacts 14. The amount of such exing is shown in FIG. 1 by a dotted line representation. his dotted line indicates the original position of the ovable contact portions 18 and of their supporting rongs at the time contact is first established with the xed contacts within the housing. As the prongs are then exed or flattened they move forward as shown to the lid line position shown in FIG. 1. Such forward moveent produces a wiping action of the movable contact ortions 18 over the engaged faces of the fixed contact ortions 16. This wiping action tends to prevent the colction of any material upon the engaged faces of the ontact portions and wipes them clean so that a good elecical contact is formed therebetween.

While FIG. 1 cannot show the existence of the dual rong elements too clearly because of the point of view om which it is taken, the character of the movable conct is clearly shown in FIG. 2. It is obvious from FIG. that in FIG. 1 there is a second prong of the arm disosed spaced underneath the prong shown which is clear- visible in FIG. 1. It is also apparent that the same is ue as to the fixed contacts 14 within the housing. Each ne of these fixed contacts comprises two spaced apart xed contact portions 16 which are supported spaced from ne another and which are disposed one above the other as to be engaged by the two movable contact porons 18 of the two prongs when the movable contacts ave been moved to the position shown in FIG. 1. The vo fixed contact portions 16 may represent fixed conicts in a single circuit or there may be two circuits, one air in one circuit and the other pair in the other, deending upon the arrangements desired.

It is apparent that when the control element 12 shown FIG. 1 is rotated so as to rotatably shift the position f the recesses 28 that receive the protuberances of the movable contacts out of position to receive such protuberances, that each movable contact arm will be swung so that contact portions of its prongs will be moved out of engagement with the contact portions 16 of its fixed contacts.

Each fixed contact extends to and is a part of an element 15, see FIG. 1, which is a male part adapted to be received within a female part of a socket receivable thereover to couple the switch into a circuit as is well understood. The fixed contact 14 shown clearly in FIG. 1 at bottom to the right as connected with male contact part 15, in same corner of the drawing, has a counterpart 14, not visible but spaced immediately below the part 14 which is visible in FIG. 1, which counterpart is connected with the male contact part 15, that superposes spaced thereabove the male contact part 15 heretofore mentioned.

Figure 4:
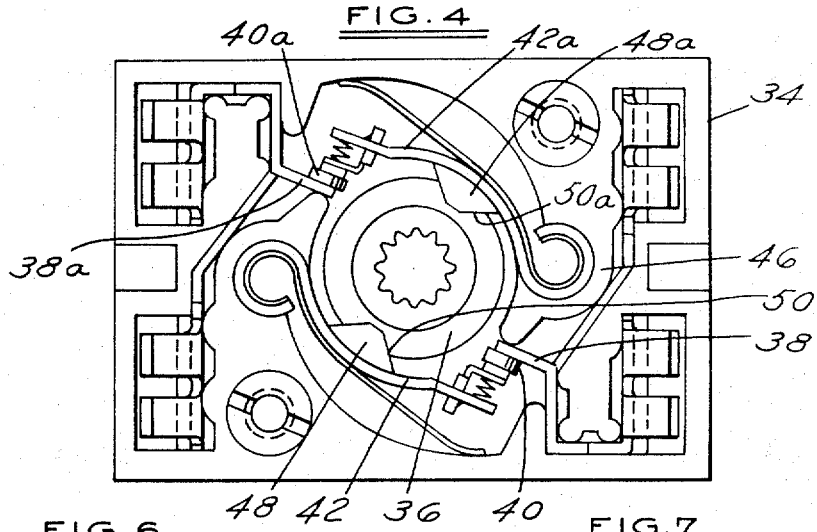
FIG. 4 is a view showing the interior and working parts of my switch as embodied in the second form of FIGS. 4 through 7.

In the second form of the switch shown in FIGS. 4 through 7, FIG. 4 corresponds with FIG. 1 in the first form. The numeral 34 indicates the casing or frame within which the movable parts of the switch are mounted. There is a control member 36 which serves the same function as control member 12 in the first form and might be a rotatable or shiftable control member, but is here shown as a rotatable one. There are two spaced apart fixed contacts located within the casing, one being indicated by the numeral 38 and the other by the numeral 38–a. These two fixed contacts are identical. Each of them has a contact portion per se indicated as to contact 38, as 40, and as to 38–a, as 40–a. These fixed contacts are adapted to be engaged by contact portions per se of a movable contact arm 42. It is understood that there are two movable contact arms 42 and 42–a as shown in FIG. 4. Such are identical.

In view of this conformation identity I am describing only one movable contact arm 42 and its cooperation with its fixed contact. The other movable contact arm 42–a and its cooperation with its fixed contact carry the same numbers plus the small letter a as was done in connection with the switch form shown in FIGS. 1 through 3. The movable arm 42 has a cylindrical base portion 44 which is shown as supported within a cylindrical housing 46 that forms a part of the non-conductive casing as illustrated in FIG. 1 so that the arm may swing rotatably within this pivotal support. The arm 42 itself is formed of electrically conductive material.

Figure 5:
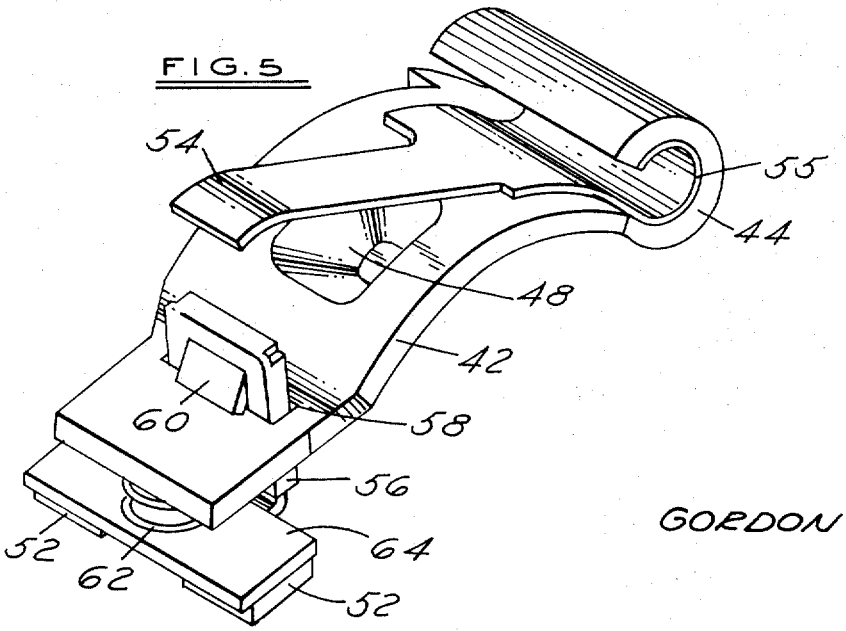
FIG. 5 is a perspective of one of the movable switch contact members corresponding as to function as to the part shown in FIG. 2 of the first form.

It is provided with a projecting hump 48 punched therefrom as shown in FIGS. 4 and 5. This hump 48 is adapted to be received at certain specific positions within a recess 50 of the control member 36 as shown in FIG. 4. This control member is provided with recesses [40] *50* and 50-a as indicated by such numerals in FIG. 4, so that when the hump is received within these recesses the arm is permitted to be moved to bring its outer end toward the fixed contact and the contact portion per se of the arm which is indicated as 52 comes into contact with the fixed contact portion per se 40 of the fixed contact 38 as shown particularly in FIG. 6.

The movement of this arm toward this closed position of the switch is accomplished by a spring element 54. Each spring element 54 is shown as having a cylindrical base portion 55 that is secured within the cylindrical base portion 44 of its movable arm, as shown particularly in FIGS. 4 and 5. This spring portion 54 is placed under tension when the parts are assembled as illustrated in FIG. 4 so that it exerts a tension on the arm tending to move the arm so that the contact portion per se 52 of the arm moves to engage the cooperating face of the fixed contact per se 40 of the fixed contact 38.

Figure 6:
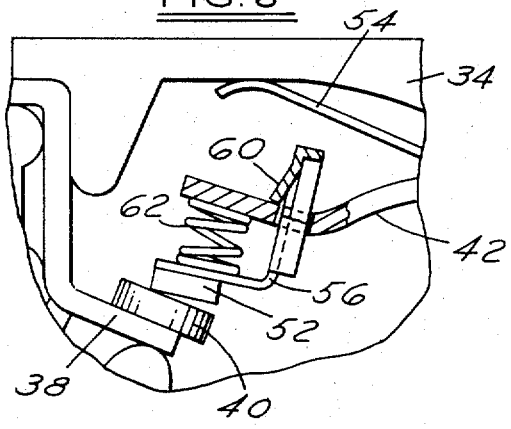
FIG. 6 is a view showing the facial position of contact between the movable contact and the fixed contact at its point of facial engagement.
Figure 7:
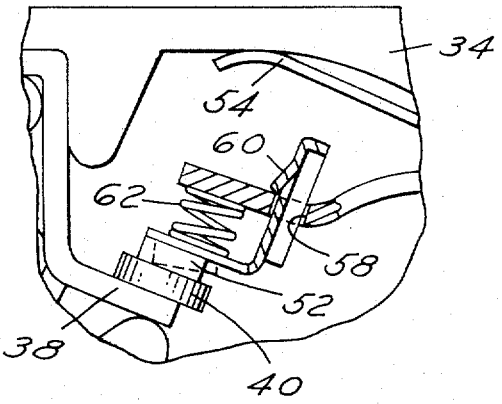
FIG. 7 is a view showing the position of the movable contact after it has been moved from the dotted line position shown in FIG. 7 to complete facial engagement with the fixed contact showing how it is wiped over the face of the fixed contact.

To the extent described the functioning is generally similar to that of the first form but this contact portion 52 at the outer end of the arm 42 is here shown as a tiltably supported contact element 56 of a right angular shape. Its construction is best illustrated in FIGS. 4, 5 and 6. The arm 42 as distinguished from the arm 20 shown in the first three figures of the drawing is in this second form a rigid, not a flexible arm. The part 52 hereinabove referred to as the contact part per se is really a face block portion 52 carried or mounted upon the angular tiltably supported part 56. This angular part 56 is as shown in FIGS. 5, 6 and 7 particularly, carried at the outer end of the arm 42 by having its generally horizontally shaped leg provided with the contact face block per se 52, two separated blocks 52 being shown in FIG. 5. As stated with respect to the two contact portions 16 in the description of the first form of the switch in FIGS. 1–3, these two contacts may represent contacts in a single circuit, or contacts in two circuits, depending upon the arrangement desired.

The generally perpendicular or upright leg is received within an opening 58 through the outer end of the arm 42. This upright leg is generally channel-shaped as shown in FIGS. 6 and 7, and has a lug 60 that is punched out of the bottom of the channel and as shown particularly in FIGS. 5, 6 and 7 forms a portion which overhangs the outer end portion of the arm and tiltably supports the part 56 as shown in these figures of the drawing. This part 56 may therefore swing tiltably to either the position shown in FIG. 6 or that shown in FIG. 7.

It will be noted that there is a small spring 62 interposed between the end portion of the arm 42 and the contact blocks 52 carried by the generally horizontally disposed leg of the angular part so that the normal position of the angular part with respect to the arm is tilted as that shown in FIG. 6. In this position the arm is descending to bring it into contact with the fixed contact of the switch and the block 52 has just been brought into contact with the fixed contact per se. Normally when the switch is open the contact 52 is out of engagement with the fixed contact. It will be noted that at this point the tiltable position of the angular portion is clearly seen. The spring 54, however, is sufficiently stronger than the spring 62 so that it easily overcomes the spring 62 and as the arm is moved downwardly under the tension of spring 54 the spring 62 is compressed from the position shown in FIG. 6 to that shown in FIG. 7.

It will be seen that as the spring 62 is compressed the part 56 is tilted counter the spring 62. As it is tilted the contact block per se carried by the horizontal arm of the part is wiped over the face of the fixed contact 40 and serves to dislodge any undesirable particles that may have collected on the faces of the two contact blocks 52 and 40 and comes fully into contact with fixed contact per se 40. It will likewise appear that the contact blocks 52 per se are carried by a plate 64 which is mounted on the horizontal leg of the part 56. Presumably the outer end of the horzontal leg might be increased in width as compared with the remainder of the angular part and the blocks 52 might be mounted directly thereon.

As heretofore stated, but one of these arm assemblies is described and the other arm assembly comprises the same parts, and numbered in the drawing by the same numbers plus the small a at the end.

What is claimed is:

1. An electric switch having a fixed contact and a movable contact, said movable contact including a [shiftable] *shiftably* supported arm provided with an electrically conductive contact portion, said arm being shiftable to shift its contact portion along a line into contact with the fixed contact [portion] and to shift the same out of contact therewith, mechanism cooperating with said arm and its electrically conductive contact portion to wipe the contact face thereof across the contact face of the fixed contact [portion] after establishment of contact between [said portions] *such faces* and to do so along a line other than the line of movement of the movable contact portion which brings it into contact with the fixed contact [portion], and wherein the arm is generally in the shape of a U having two similarly extending independently flexible prongs and each prong is provided at its outer and free end with an electric contact portion, and wherein the base of the U is adapted to serve as a support for the arm, and wherein the fixed contact [portion, and wherein the base of the U is adapted tions] *includes two spaced-apart electric contact portions,* and wherein the outer ends of the prongs of the arm may be swung with respect to the supported base and into contact with the two spaced-apart contact portions of the fixed contact and have their swinging movement arrested thereby, and wherein spring means is coupled with the U-shaped arm tending to swing the free ends thereof when the spring is tensioned and until the swinging movement of the free ends of the prongs are arrested by the fixed contact, and wherein said spring is capable of flexing both prongs of the arm when the swinging movement of the free ends of both prongs thereof under the impulse of the spring are arrested to wipe the contact portions at the free ends of the prongs of the arm across the two contact portions of the fixed contact.

2. An electric switch having a fixed contact and a movable contact, said movable contact including a [shiftable] *shiftably* supported arm provided with an electrically conductive contact portion, said arm being shiftable to shift its contact portion along a line into contact with the fixed contact [portion] and to shift the same out of contact therewith, and mechanism cooperating with said arm and its electrically conductive contact portion to wipe the contact face thereof across the contact face of the fixed contact [portion] after establishment of contact [between said portions] *therebetween* and to do so along a line other than the line of movement of the movable contact portion which brings it into contact with the fixed contact [portion], and characterized in that the arm is generally in the shape of a U having two similarly extending independently flexible prongs, each prong provided at its outer and free end with an electric contact portion, and wherein the base of the U is adapted to serve as a support for the swingable movement of the arm, a generally prong-like spring extending away from the base of the U-shaped arm and generally in the same direction as the two prongs of the U but diverging therefrom and adapted when tensioned toward the prongs of the U after the swinging movement of the free ends thereof are arrested by contact with the fixed contact to flex the prongs of the U and shift the free ends thereof with respect to the supported end of the arm and wipe the contacts on the free ends of the arm prongs over the fixed contact [portions].

[3. An electric switch having a fixed contact and a movable contact, said movable contact including a shiftable supported arm provided with an electrically conductive contact portion, said arm being shiftable to shift its contact portion and to shift the same out of contact therewith, and mechanism cooperating with said arm and its electrically conductive contact portion to wipe the contact face thereof across the contact face of the fixed contact portion after establishment of contact between said portions and to do so along a line other than the line of movement of the movable contact portion which brings it into contact with the fixed contact portion, and wherein the arm is generally in the shape of a U having two similarly extending independently flexible prongs and each prong is provided at its outer and free end with an electric contact portion, and wherein the base of the U is adapted to serve as a support for the arm, and wherein the fixed contact includes two spaced-apart electric contact portions, and wherein the outer ends of the prongs of the arm may be swung with respect to the supported base and into contact with the two spaced-apart contact portions of the fixed contact and have their swinging movement arrested thereby, and wherein spring means is coupled with the U-shaped arm tending to swing the free ends thereof when the spring is tensioned and until the swinging movement of the free ends of the prongs are arrested by the fixed contact, and wherein said spring is capable of flexing both prongs of the arm when the swing ng movement of the free ends of the prongs are arrested by the impulse of the spring are arrested to wipe the contact portions at the free ends of the prongs of the arm across the two contact portions of the fixed contact, and characterized in that the movable contact portion is tiltably supported on the free end of the arm and a spring is provided extending thereupon to tilt the same relative to its supporting arm as the movable contact is moved away from the fixed contact, and wherein said spring means acting upon the arm to swing the same toward the fixed contact overcomes the resistance of the spring that tilts the movable contact and wipes said movable contact across the face of the fixed contact as such contact portions are brought into contact.]

*4. An electric switch having a pair of spaced apart fixed contacts presenting a pair of generally co-planar spaced fixed contact faces, an arm swingably supported at one end remote from said contacts for movement of the opposite and free end toward and away from the fixed contacts with the free end of the arm overlying the same in spaced relation therefrom, spring means for biasing the arm toward the fixed contacts and into said overlying relation, a generally L-shaped contactor at the free end of the arm and having one leg of the L-shape extending toward and through the arm spaced from the free end thereof and rotatably supported and retained therein and the other leg of such L-shape extending along the arm in spaced relation therefrom toward and terminating substantially at the free end thereof, said other leg of the L-shape provided with a laterally extending current conductor underlying the free end of the arm and provided at opposite ends with contact faces disposed in opposition to the fixed contact faces, said current conductor disposed between the fixed contact faces and the overlying free end of the arm and spaced from the arm when the latter overlies the fixed contact faces, and spring means interposed between the current conductor and the free end of the arm in substantial alignment with said fixed contacts in the overlying end of the arm and biasing said L-shaped contactor to a tilted position relative to the free end of the arm and the contact faces of the current conductor to a tilted position relative to the fixed contact faces before the contact faces are fully closed.*

*5. The invention defined in claim 4 further characterized in that the end of the arm opposite said free end is provided with a hollow cylindrical base portion rotatably supported in a cylindrical recess in a fixed portion of the switch, and the first mentioned spring means comprises a leaf spring extending along and bearing against the arm intermediate its opposite ends and having a cylindrical base portion a tone end received in the hollow base portion of the arm securing the leaf spring and the arm together in operative relation.*

References Cited

The following references, cited by the Examiner, are of record in the patented file of this patent or the original patent.

UNITED STATES PATENTS

| | | | |
|---|---|---|---|
| 1,931,506 | 10/1933 | Newschaffer et al. | 200—21 |
| 2,431,197 | 11/1947 | Platt et al. | 200—164 X |
| 2,777,027 | 1/1957 | Tesh | 200—153 LB X |
| 2,804,527 | 8/1957 | Snyder et al. | 200—164 X |
| 3,249,730 | 5/1966 | Felson | 200—30 X |
| 3,016,440 | 1/1962 | Dries | 200—164 R X |
| 2,443,047 | 6/1948 | McClain | 200—166 BF |
| 3,408,462 | 10/1968 | Davies | 200—6 R |
| 3,260,803 | 7/1966 | Moroishi. | |

FOREIGN PATENTS

| | | |
|---|---|---|
| 274,559 | 7/1927 | Great Britain. |

ROBERT K. SCHAEFER, Primary Examiner

R. A. VANDERHYE, Assistant Examiner

U.S. Cl. X.R.

200—153 LB, 166 BF